United States Patent

Sands

Patent Number: 5,862,201
Date of Patent: Jan. 19, 1999

[54] REDUNDANT ALARM MONITORING SYSTEM

[75] Inventor: Mack Sands, Westminster, Mass.

[73] Assignee: Simplex Time Recorder Company, Gardner, Mass.

[21] Appl. No.: 712,980

[22] Filed: Sep. 12, 1996

[51] Int. Cl.$^6$ .............................. H04M 1/24; H04M 3/08; H04M 3/22

[52] U.S. Cl. ................................ 379/26; 379/37; 379/45; 379/49

[58] Field of Search ............................... 379/1, 9, 10, 15, 379/22, 26–29, 31–33, 37, 40, 42, 45, 46, 51, 220, 221, 212, 265, 225, 228, 232, 234, 49

[56] References Cited

U.S. PATENT DOCUMENTS

| | | | |
|---|---|---|---|
| Re. 32,856 | 2/1989 | Millsap et al. | 340/539 |
| 4,450,320 | 5/1984 | Ostermann et al. | 179/5 R |
| 4,465,904 | 8/1984 | Gottsegen et al. | 179/5 R |
| 4,511,886 | 4/1985 | Rodriguez | 340/534 |
| 4,825,457 | 4/1989 | Lebowitz | 379/40 |
| 4,868,859 | 9/1989 | Sheffer | 379/39 |
| 4,887,290 | 12/1989 | Dop et al. | 379/33 |
| 4,937,851 | 6/1990 | Lynch et al. | 379/32 |
| 4,993,059 | 2/1991 | Smith et al. | 379/39 |
| 5,125,021 | 6/1992 | Lebowitz | 379/40 |
| 5,128,979 | 7/1992 | Reich et al. | 379/40 |
| 5,134,644 | 7/1992 | Garton et al. | 379/39 |
| 5,146,486 | 9/1992 | Lebowitz | 379/40 |
| 5,233,640 | 8/1993 | Kostusiak | 379/39 |
| 5,249,223 | 9/1993 | Vanacore | 379/45 |
| 5,253,288 | 10/1993 | Frey et al. | 379/221 |
| 5,323,444 | 6/1994 | Ertz et al. | 379/212 |
| 5,327,478 | 7/1994 | Lebowitz | 379/40 |
| 5,388,145 | 2/1995 | Mulrow et al. | 379/45 |
| 5,404,350 | 4/1995 | DeVito et al. | 379/45 |
| 5,408,520 | 4/1995 | Clark et al. | 379/93 |
| 5,424,708 | 6/1995 | Ballesty et al. | 379/37 |
| 5,454,024 | 9/1995 | Lebowitz | 379/40 |
| 5,454,025 | 9/1995 | Mulrow et al. | 379/45 |
| 5,481,602 | 1/1996 | Griffiths et al. | 379/210 |

Primary Examiner—Curtis A. Kuntz
Assistant Examiner—Binh K. Tieu
Attorney, Agent, or Firm—Hamilton, Brook, Smith & Reynolds, P.C.

[57] ABSTRACT

An alarm system includes plural customer sites and first and second alarm monitoring stations. Each customer site has an alarm communicator for calling a monitoring station and transmitting an alarm message. The first and second monitoring stations are provided for receiving the alarm message through a telecommunications network. Each monitoring station includes an alarm processor system for processing the alarm message. Alternate routing in the network allows an alarm call to be rerouted from the first monitoring station to the second central monitoring station if the alarm call to the first station cannot be completed.

9 Claims, 2 Drawing Sheets

REDUNDANT ALARM MONITORING SYSTEM

BACKGROUND OF THE INVENTION

A centralized alarm monitoring system is an efficient way to handle alarm reporting from multiple remote customer sites. Typically, an alarm control panel at a customer site includes an automatic dialer that is pre-programmed to call a central monitoring station upon detection of an alarm event. When the call is completed through the public switched telephone network to the central monitoring station, the alarm control panel sends an alarm message to the central station for processing and response. One problem is that the central station may not be accessible. This may be due to telephone network congestion, a network fault, or a fault at the central station itself.

One approach to the problem of inaccessibility of the central station is to periodically redial the access number until the call can be completed. This approach has the difficulty that if there is a network fault or a fault in the central station, the call cannot be completed and thus the alarm message cannot be delivered.

Another approach is to program the dialer with a secondary access number for reaching the central station. This approach is useful for the case where the primary access number is busy. However, this approach suffers from the same difficulty as the first approach in that the call cannot be completed if there is a network fault or a fault in the central station. Another difficulty is that many customer sites may have dialers that can only be programmed to dial a single access number.

SUMMARY OF THE INVENTION

The above and other problems are solved by the alarm monitoring system of the present invention. The alarm system of the present invention uses a single access number and alternate destination network routing to provide a redundant alarm monitoring system. Use of a single access number simplifies the programming of customer dialers. Alternate destination routing to redundant alarm monitoring stations allows an alarm monitoring service provider to offer a higher level of service.

Accordingly, an alarm system of the present invention includes plural customer sites and at least first and second alarm monitoring stations. Each customer site has an alarm communicator for calling a monitoring station and transmitting an alarm message. The first and second monitoring stations receive the alarm message through a telecommunications network, each monitoring station having an alarm processor system for processing the alarm message. Alternate routing in the network allows an alarm call to be automatically rerouted from the first monitoring station to the second monitoring station if the alarm call to the first station cannot be completed.

According to one aspect of the invention, each alarm processor system includes a customer database for responding to alarm messages. A data link between the alarm processor systems links the customer databases. The customer database of one alarm processor system can be updated over the data link when an alarm call has been routed to the other alarm processor system such that the customer databases are redundant.

According to another aspect of the invention, the communicator is coupled to a telephone line to which a line fault detector is connected. A backup communicator, preferably a cellular transceiver, is provided for calling the monitoring station if a fault is detected on the telephone line. This provides communication redundancy at both ends of the system.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views.

DETAILED DESCRIPTION OF THE PREFERRED EMBODIMENT

Figure 1:
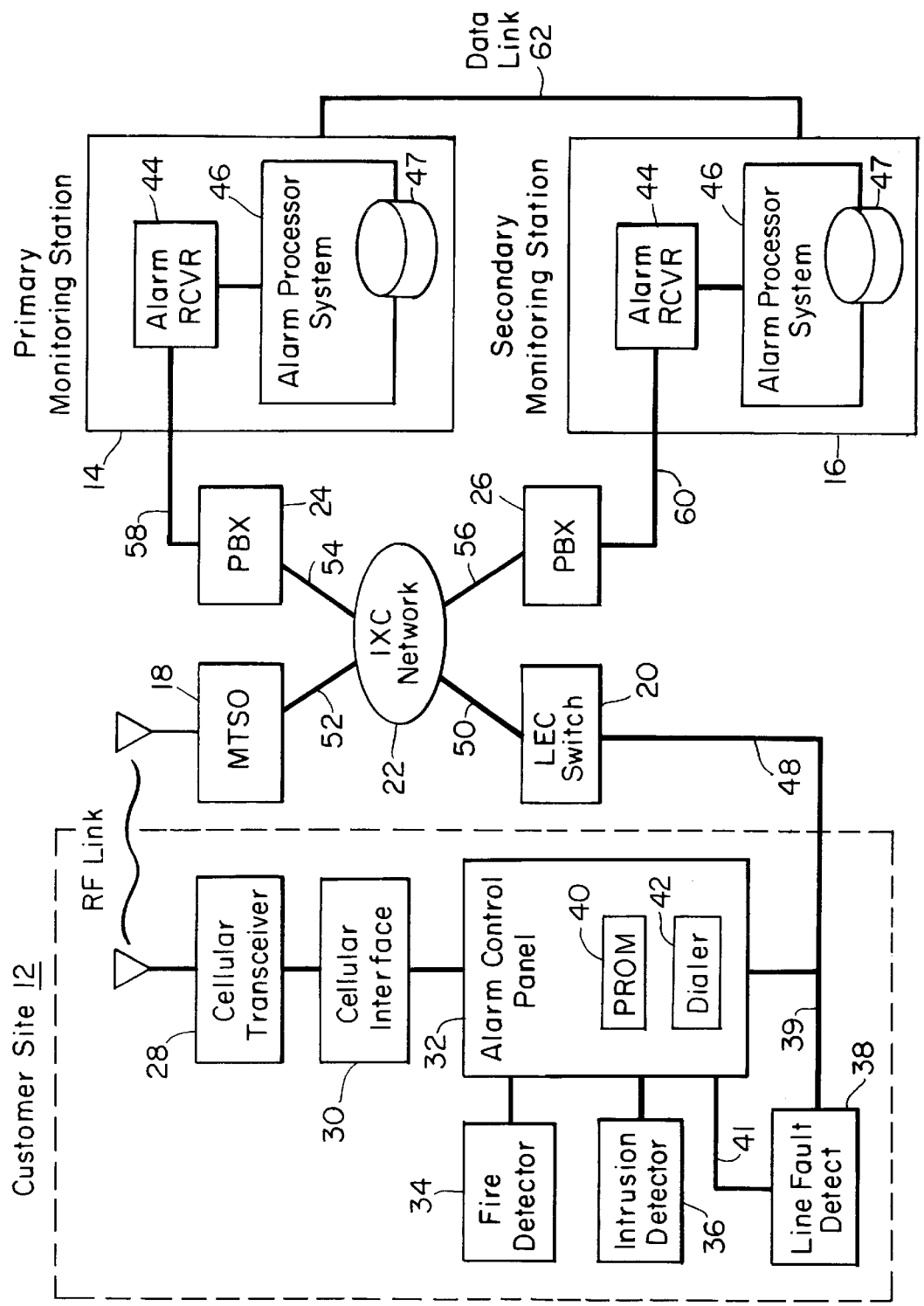
FIG. 1 is a schematic block diagram of an alarm monitoring system in accordance with the present invention.

Referring now to FIG. 1, a preferred embodiment of an alarm monitoring system is shown which illustrates the principles of the present invention. The alarm monitoring system generally comprises one or more customer sites 12 and alarm monitoring stations 14, 16 connected to a telecommunications network. An exemplary telecommunications network is shown comprising a local exchange carrier (LEC) switch 20, an interexchange carrier (IXC) network 22, and private branch exchange (PBX) switches 24, 26. For an alternative access arrangement described further herein, a mobile telephone switching office (MTSO) 18 is also included in the telecommunications network. The customer site 12 connects to the LEC switch 20 over telephone line 48 and the alarm monitoring stations 14, 16 connect to PBX switches 24, 26 over direct inward dialing (DID) circuits 58 and 60, respectively.

An important feature of the telecommunications network is the capability to perform alternate destination routing (ADR). ADR is a capability usually provided in the IXC network 22 which functions to reroute telephone calls to an alternate destination when a primary destination is inaccessible. U.S. Pat. No. 5,253,288 entitled "Alternate Destination Call Redirection for Telecommunications Systems", Frey et al., incorporated herein by reference, discloses such a capability. The primary destination may be inaccessible for any of several reasons, including network congestion, busy trunks, or a fault at the primary destination itself. The alarm monitoring system of the present invention takes advantage of an IXC network 22 having such an ADR capability to reroute alarm calls from one monitoring station to another. In this manner, reliability of alarm message delivery from a customer site to a monitoring station is improved allowing an alarm monitoring service provider to offer a higher level of service. As will be evident from the below description of the system operation, the alarm system of the present invention also allows use of a single access number which simplifies the programming of customer dialers. Further, the alarm monitoring service provider can relocate the redundant monitoring stations geographically in a manner that is transparent to customers.

The customer site 12 includes an alarm control panel 32 connected to one or more detectors 34, 36. The detectors 34, 36 are conventional sensor devices configured to detect alarm events such as fire and intrusion at the customer site 12. The alarm control panel 32 is also a conventional device which collects alarm events from the detectors 34, 36 and formats alarm messages for transmission to a remote alarm monitoring station. Alarm message formats can be any of several well-known formats, including Security Industry Association (SIA), 3X1, 4X2, Contact ID or per point ID (CID), and binary frequency shift key (BFSK).

The alarm control panel 32 includes a programmable read-only memory (PROM) 40 and a telephone dialer 42. The PROM 40 contains program instructions for the alarm control panel functions including alarm collection and message formatting. The dialer 42 functions as an alarm communicator to dial a preprogrammed telephone number to access one of the alarm monitoring stations 14, 16 and transmit formatted alarm messages. Intrusion alarm control panels usually have an integral dialer. Fire control panels may not be equipped with a dialer, in which case, an external digital alarm communicator transmitter (DACT) can be added to perform the dialer function.

A line fault detect circuit 38 coupled to the telephone line 48 at line 39 provides a means for detecting telephone line problems. If the line fault detect circuit 38 detects a problem on telephone line 48, a fault indication is passed on line 41 to the alarm control panel 32 which responds by switching to a backup communicator at the customer site to provide alternate access to the telecommunications network. The backup communicator comprises a cellular transceiver 28 and cellular interface 30 coupled to the alarm control panel 32. The cellular interface 30 converts the telephone access number to an appropriate cellular format for calling the alarm monitoring stations 14, 16 through the cellular transceiver 28 to an MTSO switch 18 in the network. In an alternative embodiment, the cellular transmission of the alarm messages is via cellular digital packet data (CDPD).

While the alternate access from the customer site 12 to the telecommunications network in the preferred embodiment is provided by a cellular transceiver, one skilled in the art will recognize that alternate access could instead be provided by a second telephone line or by other wireless technologies such as a personal communications network.

The alarm monitoring stations are designated as primary monitoring station 14 and secondary monitoring station 16 respectively. Each monitoring station includes a station receiver 44 and an alarm processor system 46. The station receiver 44 is a conventional data communications equipment such as a data modem which terminates the telephone connection from line 58 or 60. Alarm messages are received by the station receiver 44 from the customer site 12 and passed to the alarm processor system 46 for processing and response. The alarm processor system 46 can be any UL-listed computer platform running alarm processing software.

Each alarm processor system 46 includes a customer database 47 for responding to alarm messages. A data link 62 between the primary and secondary alarm monitoring stations 14, 16 provides a communications path for linking the respective customer databases 47. The data link 62 can be provided by, for example, a 56 Kbps data line, ISDN, or frame relay. The customer database 47 of one alarm processor system can be updated over the data link 62 when an alarm call has been routed to the other alarm processor system. This linking provides a means for maintaining redundant alarm information in the two distinct databases 47. Thus, by keeping the customer databases updated relative to each other, if one of the alarm monitoring stations was to become totally unavailable, such as in a disaster scenario, the other station would be able to continue operating.

Figure 2:
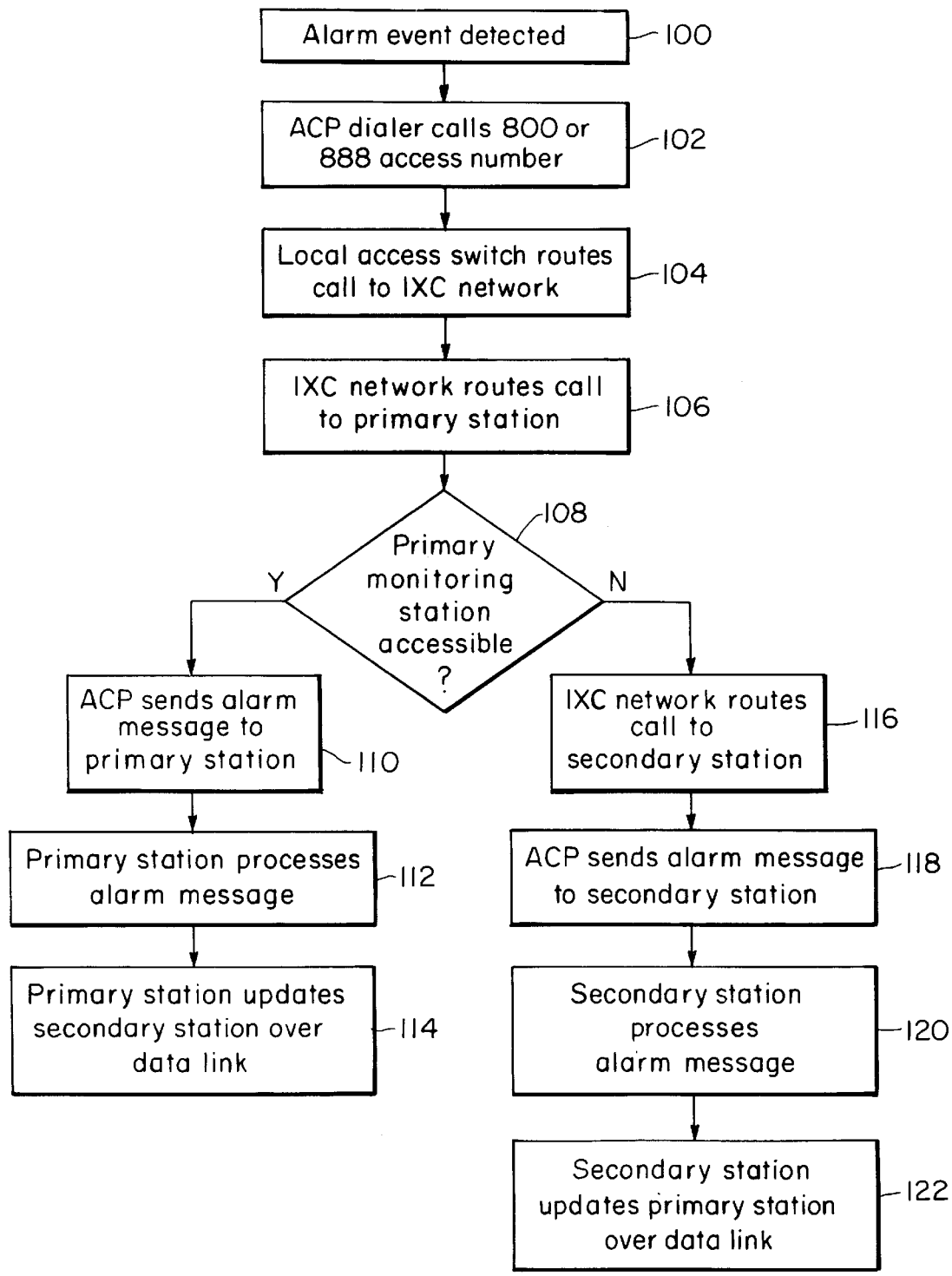
FIG. 2 is a flow diagram illustrating the alarm call routing in accordance with the present invention.

Referring now to the flow diagram of FIG. 2, the operation of the alarm system will now be described. As noted above, the alarm control panel 32 collects alarm events from detectors 34, 36 and formats an alarm message for transmission to an alarm monitoring station. In response to an alarm event being detected at step 100, the dialer 42 of alarm control panel 102 seizes the telephone line 48 and calls an access number, such as a toll-free 800 (or 888) access number, at step 102. At step 104, The LEC switch 20 routes the call to the IXC network 22. The IXC network 22 recognizes that alternate destination routing treatment is associated with the particular 800 access number, as described in U.S. Pat. No. 5,253,288. The IXC network 22 initially attempts to route the alarm call to the primary monitoring station 14 on primary network path 54 at step 106. If the primary routing attempt receives from the primary station 14 ring/no answer for a set period of time or a busy signal at step 108, the IXC network 22 reroutes the call along a secondary network path 56 at step 116. It should be noted that the primary and secondary network paths 54 and 56, respectively, are shown for simplicity as single trunk lines. These network paths 54, 56 would include portions within the IXC network 22 and could also include portions through a local exchange network.

If at step 108 the primary monitoring station 14 is accessible, the call is completed and the alarm control panel 32 transmits the alarm message in the appropriate format to the primary station 14 at step 110. The primary station 14 processes the alarm message in its alarm processor system 46 at step 112. The alarm processor system also updates the customer database 47 of the secondary monitoring station 16 over data link 62 at step 114.

As noted above, if the primary station 14 is not accessible at step 108, the IXC network routes the call to the secondary station at step 116. The call is completed and the alarm control panel 32 transmits the alarm message to the secondary station 16 at step 118. The secondary station 16 processes the alarm message in its alarm processor system 46 at step 120. The alarm processor system also updates the customer database 47 of the primary monitoring station 14 over data link 62 at step 122.

It should be noted that the alternate destination routing described above with reference to FIGS. 1 and 2 operates in the same manner if the backup cellular access arrangement is used.

While this invention has been particularly shown and described with references to preferred embodiments thereof, it will be understood by those skilled in the art that various changes in form and details may be made therein without departing from the spirit and scope of the invention as defined by the appended claims. For example, call forwarding provided by the local exchange switch can be used instead of alternate destination routing to reroute alarm calls to a secondary monitoring station when the primary station is not accessible.

What is claimed is:

1. An alarm system comprising:
   a customer site having an alarm communicator for originating an alarm call to an alarm monitoring station and transmitting an alarm message;
   a first monitoring station for receiving the alarm message through a telecommunications network, the first monitoring station having a first alarm processor system for processing the alarm message, the first alarm processor system including a customer database for responding to the alarm message;
   a second monitoring station for receiving the alarm message through the telecommunications network and having a second alarm processor system for processing the alarm message, the second alarm processor system including a customer database for responding to the alarm message;

alternate routing in the network for initially routing the alarm call to the first monitoring station and for subsequently rerouting the alarm call to the second monitoring station if the alarm call to the first monitoring station cannot be completed; and a data link between the first and second alarm processor systems for linking the customer databases wherein the linking includes updating the customer database of one of the first and second alarm processor systems when the call has been routed to the other of the first and second alarm processor systems such that the customer databases are redundant.

2. The system of claim 1 wherein the communicator is coupled to a telephone line and the customer site further comprises a line fault detector for detecting a fault in the telephone line and a backup communicator for calling the monitoring station if a fault is detected.

3. The system of claim 2 wherein the backup communicator comprises a cellular transceiver.

4. The system of claim 1 wherein the customer site further includes an alarm control panel for generating the alarm message.

5. An alarm monitoring system comprising:

an alarm communicator coupled to a telephone line at a customer site for originating an alarm call and transmitting an alarm message;

a first monitoring station for receiving the alarm message through a telephone network, the first monitoring station having a first alarm processor system for processing the alarm message, the first alarm processor system including a customer database for responding to the alarm message;

a second monitoring station for receiving the alarm message through the telephone network and having a second alarm processor system for processing the alarm message, the second alarm processor system including a customer database for responding to the alarm message;

alternate routing in the network for initially routing the alarm call to the first monitoring station and for subsequently rerouting the alarm call to the second monitoring station if the alarm call to the first monitoring station cannot be completed; and a data link between the first and second alarm processor systems for linking the customer databases wherein the linking includes updating the customer database of one of the first and second alarm processor systems when the call has been routed to the other of the first and second alarm processor systems such that the customer databases are redundant.

6. The system of claim 5 further comprising a line fault detector for detecting a fault in the telephone line and a backup communicator for calling the monitoring station if a fault is detected.

7. The system of claim 6 wherein the backup communicator comprises a cellular transceiver.

8. In a telecommunications network, a method of alarm monitoring comprising the steps of:

providing an alarm message at a customer site;

providing a first monitoring station for receiving the alarm message through the telecommunications network at a first network destination, the first monitoring station having a first alarm processor system for processing the alarm message, the first alarm processor system including a customer database for responding to the alarm message;

providing a second monitoring station for receiving the alarm message through the telecommunications network at a second network destination, the second monitoring station having a second alarm processor system for processing the alarm message, the second alarm processor system including a customer database for responding to the alarm message;

providing a data link for linking the customer databases;

calling a monitoring station telephone number from the customer site;

routing the call to the first monitoring station if the first network destination is available;

otherwise, rerouting the call to the second monitoring station;

transmitting the alarm message from the customer site; and updating the customer database of one of the first and second alarm processor systems when the call has been routed to the other of the first and second alarm processor systems such that the customer databases are redundant.

9. The method of claim 8 further comprising the step of generating the alarm message at an alarm control panel.

* * * * *